United States Patent [19]
Lambou et al.

[11] 3,856,700
[45] Dec. 24, 1974

[54] PERCURSOR COMPOSITIONS FROM ANIMAL HIDE GLUES FOR DRY-STRUCTURED FOAMS

[75] Inventors: Madeline G. Lambou; James J. Spadaro, both of New Orleans, La.

[73] Assignee: The United States of America as represented by the Secretary of Agriculture, Washington, D.C.

[22] Filed: Dec. 4, 1972

[21] Appl. No.: 311,611

[52] U.S. Cl. ............ 252/354, 47/2, 47/34.11, 47/DIG. 11, 106/131, 106/135, 206/46 FC, 252/8.05, 252/356
[51] Int. Cl. ............ B01f 17/30
[58] Field of Search ............ 252/354, 8.05, 356; 106/131, 135; 47/2, 34.11, DIG. 11; 206/46 FC

[56] References Cited
UNITED STATES PATENTS 2,154,231  4/1939  Daimler et al. ............ 252/354 X
2,875,555  3/1959  Tniegs et al. ............ 47/2
2,900,267  8/1959  Cavanaugh ............ 106/135
2,945,322  7/1960  Gaeth et al. ............ 252/8.05 X FOREIGN PATENTS OR APPLICATIONS
850,049  8/1970  Canada ............ 47/2

*Primary Examiner*—Benjamin R. Padgett
*Attorney, Agent, or Firm*—M. Howard Silverstein; Max D. Hensley

[57] ABSTRACT

Economical agricultural foams have been prepared from certain formulations which contain animal hide glue and a surfactant. These agricultural foams are very lightweight and form "skins" which protect the foams while they cure at temperatures of 0° to −20°C. Curing drys the foams and permits them to retain their foam-like structure in the dry state. Such foams are suitable for light-weight packing materials or insulation.

7 Claims, No Drawings

PERCURSOR COMPOSITIONS FROM ANIMAL HIDE GLUES FOR DRY-STRUCTURED FOAMS

A non-exclusive, irrevocable, royalty-free license in the invention herein described, throughout the world for all purposes of the United States Government, with the power to grant sublicenses for such purposes, is hereby granted to the Government of the United States of America.

This invention relates to collagenous fibrous proteins, which on hydrolysis yield alpha amino acids or their derivatives. More specifically, this invention relates to the preparation of improved agricultural foams. These agricultural foams are designed to protect lightweight, sensitive materials during shipment by providing a safe, resilient cushion and also to provide insulation in a variety of situations.

DEFINITIONS AND BACKGROUND

Agricultural foams contain glues derived from collagen which is a protein constituent of animal hide materials and bone. The foams of the present invention are of hide glue origin. Hide glues are derived from collagenous materials present in hide pieces and in the connective tissues associated with the hide. Collagen, among other compounds, contains a disproportionately high content of hydroxyproline and proline, respectively 14 and 15 percent.

The materials from which the glues of this invention are obtained originate with the packing and canning industries and are principally of cattle origin. Hide glues are available in a wide range of test brands reflecting gradation as to physical properties. As a group, hide glues are the strongest and most versatile of animal glues with respect to broad usage in industry. The glues of the present invention were selected for the preparation of aricultural foams because animal glues are basically collagen.

The National Association of Glue Manufacturers, Inc., with headquarters in New York City, has prepared a booklet bearing the title "Animal Glue in Industry" describing an excellent overall view on glues. From this piece of literature we learn that "Animal glue is an organic colloid of protein derivation which meets with constantly increasing acceptance for adhesive, sizing and coating composition, and colloidal applications in industry. This product is the oldest type of glue . . . ."

Skin is a term used with reference to the agricultural foams of this invention in describing the outermost layer and is usually a continuous filament-type layer which forms on top the wet foam within 1 to 4 hours after the foam has been allowed to set. This skin protects the foam underneath during the curing operation and adds strength to the dry-structured material. The skin of our foams has a thickness of about from 0.001 to 0.0001 inch.

A colloidal dispersion is one in which very finely divided particles of one substance (the disperse-phase) are suspended in another (the dispersion medium) in such a manner and degree that the electrical and surface properties acquire special importance. The collodial state is characteristic of living matter and materials derived therefrom such as protein and fat. The animal hide glues are of protein derivation.

THE PRIOR ART

There are many patents issued purporting to manufacture fire-fighting foams from all kinds of protein hydrolysates: U.S. Pat. Nos. 2,212,470; 2,324,951; 2,361,057; 2,405,438; 2,413,667; 2,470,719; 2,515,276; and to shield plants from frost and freeze damage: 2,875,555. The volume of foam produced by their processes would be 10 times as great as that of the formulation from which the foam was produced. Polymer-forming materials were included in their formulations. These inventors do not disclose having cured and tanned such foams to make dry-structured materials, light in weight and highly resilient that can be used as packing material and insulation.

Comparatively, it should be noted that the volume of the foam of the present invention is kept at between approximately 30 and 90 times as great as the formulation from which it originated. The hide glues of the present invention are polymers; the viscosity-builder is a polymer; and no saponin is employed. The saponin used by others corresponds to our surfactants, which happen to be high foaming agents such as a lauryl sulfate. The polymeric materials employed by the prior art corresponds to our glues and viscosity-builder. The quantities which have led to our preferred embodiments indicate formulations which would contain about 4–5% glue, 2% of the surfactant, and about 0.2% of the viscosity-builder, which is a polymer also.

In the prior art also we find an article by Paul A. Sanders which appears in Vol. 84 of the October 1969 issue of American Perfumer and Cosmetics under the title "Unusual Aqueous Aerosol Foams." The composition and properties of these foams have different uses than those of the agricultural foams of the present invention, which were prepared at the Southern Marketing and Nutrition Research Division in New Orleans, Sanders' foams are principally for use as cosmetics and in pharmaceutical products, and are characterized as "snowflake foam," "crackling foam," "collapsing foam," "buoyancy foam," etc. Such materials would not be suitable for the type material made by this patent.

OBJECTIVES OF THE PRESENT INVENTION

The main object of the present invention is to provide strong resilient foams that may be used as packing material.

A secondary object of the present invention is to provide dry foams which could be used as light-weight highly efficient insulation.

The present invention deals with formulations which yield light-weight, low-cost, persistent foams prepared from agricultural products. The foams produced by the formulations of this invention concern the protection of highly sensitive materials being shipped. The foams of this invention have been designed to serve as specialty packing material or as insulation.

In the investigative work leading to the present invention several commercial animal hide glues were tested and found effective in the generation of foams that can be cured to dry structures. With reference to the persistence of the foams, that is, if they would endure during the curing period, it was determined that this quality could be enhanced by the choice of surfactant. Foams, stable during the curing period, were generated from formulations containing 2 to 5% glue and 2% surfactant.

In the process of investigation, animal hide glues were selected because they are generally water-soluble, because they can be formulated to yield foams from a water-based colloid, and are relatively inexpensive to make. These foams are made from nontoxic ingredients and can be made of different weights and densities. The greater the weight and the higher the density, the longer the dry foam can resist deformation. Foams of these types may be used as packing material, the heavier weight foams being used for packages requiring more durable packing. On the other hand, dry structured foams investigated could also be used as lightweight insulation. Durability of both the packing material and insulation could be enhanced by tanning with volatile chemicals such as formalin and formaldehyde-yielding compounds. Exposure of the dry foams to gaseous formaldehyde enhances resistance to high humidity and moisture.

Temperatures of packing materials and insulation are frequently much higher than considered normal. The dry structured foams of this invention have withstood temperatures in excess of 176°F.

THE PROBLEM

Investigative work conducted by Louisiana State University in the year 1967 indicates that foams having a use-life of 24 to 48 hours under freezing weather conditions were obtained when edible gelatin was used as the stabilizer; however, this stabilizer is unsuitable for large-scale crop protection mainly because of the costs of ingredients and manner of application. The objective of the work was mainly to develop formulations and reduce costs to the lowest possible level while maintaining all other requirements for the foams. The requirements for such foams included low cost, easy generation, zero toxicity (for both plants and animals), sufficient stability to maintain an adequate cover overnight in freezing temperatures and to dissipate with rising temperatures. The combined requirements called for foams with insulative capacities which would allow them to serve as protective covers under adverse weather conditions when winds are high and temperatures drop to, or below, freezing.

The preferred spumific formulations were products of investigative effort. These formulations contain a quantity of inedible animal glues which are most suitable. The most suitable glues were of a jelly strength ranging from 150 to 411 grams, and were evaluated for drainage, density, and expansion. Methods in *Industrial and Engineering Chemistry*, Vol. 2, No. 3, pp. 310–315, July 15, 1930, were employed as well as the technique reported by Braud and Chesness in their "Physical Properties of Foam Insulation for Protecting Plants Against Cold Weather," a paper which was presented at the Winter Meeting of the American Society of Agricultural Engineers in Chicago, Illinois which was held on December 10-13, 1968.

Rapid screening tests were employed to determine a suitable concentration of animal glue for a formulation, using small volumes of the prepared formulations, then basing the tests on liquor drainage from the foam at 36°F. The preferred formulations were then scaled up and put through the foam generator, observing more precise measurement and technique. Certain guidelines in the handling of the glues were obtained from literature published by the National Association of Glue Manufacturers, Inc.

The laboratory-size cone-type foam generator fabricated by Braud and Chesness, authors of the previously cited paper, was used to evaluate the selected foams comparatively. The generated foams were collected in weighed pans which were 8 inches in diameter and 3 inches in depth, and fitted with drainage tubes. The generated foams were observed at 36°F. The drained liquor was collected in the most suitable graduated cylinders (100 ml). Drainage was measured (in ml) as quantity of liquor leached from the foam with respect to quantity of time, that is, "volume vs. time." Density and Expansion were calculated from the weight and volume of the foam.

We have discovered that animal hide glues are effective stabilizers in formulations used to generate foams for packing material and insulation. Persistance of the foams was enhanced by choice of surfactant. Foams stable at 36°F could be generated from formulations containing 2 to 5% animal glue and 2% surfactant.

The following examples are provided to illustrate the invention, utilizing the preferred embodiments, and are not to be construed as limiting the invention in any manner whatever. Examples 2 through 5 are based on example 1.

EXAMPLE 1

Water-based foam formulations were prepared from two parts of a foaming agent, usually a long chain alkyl sulfate such as a lauryl sulfate, added to 4 to 5 parts of a stabilizer, such as animal hide glues ranging in gel-strength from 135 to 411 gms after the glues had been allowed to imbibe water overnight and were dispersed in colloidal solution in water by heating to 35°-45°C. A stable foam having a wet density of 0.0111 to 0.0420 could be prepared by whipping the glue and surfactant mixture with a food mixer, a Waring Blender, a specially designed foam generator, or any mechanical foaming device. Foams prepared as above endured at 36°F without draining for 24–48 hrs and more. When such a foam is allowed to cure in a refrigerator at approximately 0°C or in a freezer at −20°C for 7 days to 2 weeks it becomes a dry-structured foam, highly resilient, light in weight with a density less than 0.00300. Such a dry-structured foam is suitable for light-weight packing material or insulation.

EXAMPLE 2

In which the animal glue, hydrolized to a gel-strength of 135 gms, was used at a concentration of 4% and after imbibing water was heated to 33°-38°C. Two percent of a surfactant was added when the colloidal dispersion had returned to room temperature. Wet density ranged from 0.0176 to 0.0197. No drainage from the foam occurred in 24 hours at 36°F. Expansion was 51 to 57 times. This foam remained under refrigeration for 9 days during which it cured as a dry-structured foam-like material.

EXAMPLE 3

In which the animal glue, hydrolyzed to a gel-strength of 192 gms, was used at a concentration of 5%. The proper volume of water was allowed to be imbibed overnight and the system was heated to 35°-40°C to effect colloidal dispersion. Two percent of a surfactant was added and the mixture was put through a screen-type foam generator. Density of the wet foam ranged from 0.0299 to 0.0356; expansion ranged from 32 to 28 times. No drainage occurred at 36°F over a period of 9 days. When removed from storage three-fourths inch of dry structured foam-like material was obtained.

EXAMPLE 4

In which the animal glue, hydrolyzed to a gel-strength of 200 gms., was used at a concentration of 4%. The measured volume of water and the glue were mixed and the glue was allowed to imbibe water overnight at room temperature. A colloidal dispersion was obtained by melting at 28°C. On cooling two percent of a surfactant was added. Density of the foam ranged from 0.0318 to 0.0418 and expansion ranged from 31 to 24 times. No drainage occurred in the first 24 hours at 36°F. Pans containing this formulation were removed after the first 24 hours (at 36°F) to a freezer at −20°C where they remained for eight days. When examined, a highly resilient, dry-structured foam with a depth of more than 2 inches was obtained. Recovery after deformation was instantaneous.

EXAMPLE 5

In which the animal glue, hydrolyzed to a gel-strength of 150 gms., was used at a concentration of 4%. After imbibition of water overnight, the mixture was heated at 34°–37°C to effect colloidal dispersion. When cooled to room temperature, 2% surfactant was added and the foam was generated in a double cone generator. Density ranged from 0.0178 to 0.0246 and expansion ranged from 56 to 41 times. No drainage occurred in 24 hours at 36°F. Pans remained in storage at that temperature for 8 days. A 2 inch thick dry-structured foam was obtained.

Other examples are outlined in Table A.

TABLE A

| Gel-strength | % Conc. | Heat Applied | Wet Density | Expansion | Curing °F/days |
|---|---|---|---|---|---|
| 250 gms | 5 | 28–38°C | 0.0159–0.0176 | 57–63 | 36°/8 |
| 250 gms foamy | 4 | 41°C | — | — | 36°/23 |
| 411 gms | 3 | 30–35°C | — | — | 36°/22 |

Above dried foams were light in weight and showed complete recovery after deformation instantaneously. All of the animal glues cited in the examples will produce good dry-structured foams which may be used for packaging material or insulation.

Preferred glues of this invention are animal hide glues hydrolyzed to jelly bloom strengths of 135–411 as shown below.

| Glue | Jelly Bloom Strength Range | Midpoint |
|---|---|---|
| 5X Reg-135 gms | 122–149 | 135 |
| (150) Bloom F.O.S. Tech. Gel | 136–164 | 150 |
| 3X Reg-192 gms | 178–206 | 192 |
| (200) Bloom F.O.S. Tech. Gel | 186–214 | 200 |
| (250) gm Foamy | 236–265 | 250 |
| 411 Grams Foamy | 395–427 | 411 |

We claim:

1. A foam precursor composition consisting of a homogenous aqueous emulsion of at least about 4% of an animal hide glue hydrolyzed to a jelly strength of 135–411 gms and about 2% of a surfactant.
2. The composition of claim 1 wherein the animal hide glue has a jelly strength of 135 gms.
3. The composition of claim 1 wherein the animal hide glue has a jelly strength of 150 gms.
4. The composition of claim 1 wherein the animal hide glue has a jelly strength of 192 gms.
5. The composition of claim 1 wherein the animal hide glue has a jelly strength of 200 gms.
6. The composition of claim 1 wherein the animal hide glue has a jelly strength of 250 gms.
7. The composition of claim 1 wherein the animal hide glue has a jelly strength of 400 gms.

* * * * *